United States Patent [19]

Petri et al.

[11] Patent Number: 5,362,578
[45] Date of Patent: Nov. 8, 1994

[54] INTEGRATED MAIN RAIL, FEED RAIL, AND CURRENT COLLECTOR

[75] Inventors: Randy J. Petri, Crete; John Meek, Downers Grove; Robert P. Bachta, Chicago; Leonard G. Marianowski, Mount Prospect, all of Ill.

[73] Assignee: Institute of Gas Technology, Chicago, Ill.

[21] Appl. No.: 986,970

[22] Filed: Dec. 8, 1992

[51] Int. Cl.[5] .................. H01M 8/08; H01M 8/14
[52] U.S. Cl. ........................... 429/35; 429/36; 429/39
[58] Field of Search ........................... 429/35, 36

[56] References Cited

U.S. PATENT DOCUMENTS

| | | | |
|---|---|---|---|
| 3,514,333 | 5/1970 | Novack | 136/86 |
| 3,723,186 | 3/1973 | Borucka et al. | 136/153 |
| 3,867,206 | 2/1975 | Trocciola et al. | 136/86 D |
| 4,160,067 | 7/1979 | Camara et al. | 429/16 |
| 4,276,355 | 6/1981 | Kothmann et al. | 429/35 |
| 4,329,403 | 5/1982 | Baker | 429/35 |
| 4,416,955 | 11/1983 | Chi | 429/36 |
| 4,510,213 | 4/1985 | Schnacke | 429/36 |
| 4,579,788 | 4/1986 | Marianowski et al. | 429/16 |
| 4,609,595 | 9/1986 | Nickols | 429/36 |
| 4,708,916 | 11/1987 | Ogawa et al. | 429/38 |
| 4,761,348 | 8/1988 | Kunz et al. | 429/35 |
| 4,769,298 | 9/1988 | Hosaka | 429/34 |
| 4,895,774 | 1/1990 | Ohzu et al. | 429/35 |
| 4,963,442 | 10/1990 | Marianowski et al. | 429/35 |

Primary Examiner—David B. Springer
Attorney, Agent, or Firm—Speckman, Pauley & Fejer

[57] ABSTRACT

A separator plate for a fuel cell comprising an anode current collector, a cathode current collector and a main plate, the main plate disposed between the anode current collector and the cathode current collector. The anode current collector forms a flattened peripheral wet seal structure and manifold wet seal structure on the anode side of the separator plate and the cathode current collector forms a flattened peripheral wet seal structure and manifold wet seal structure on the cathode side of the separator plate. In this manner, the number of components required to manufacture and assemble a fuel cell stack is reduced.

26 Claims, 5 Drawing Sheets

INTEGRATED MAIN RAIL, FEED RAIL, AND CURRENT COLLECTOR

The U.S. Government has rights in this invention as provided for by the terms of D.O.E. Contract No. DE-AC21-90MC27394 awarded by the U.S. Department of Energy.

BACKGROUND OF THE INVENTION

1. Field of the Invention

This invention relates to internally manifolded and internally manifolded and internally reformed fuel cell stacks, and in particular, subassemblies of an anode/current collector/separator plate/current collector/cathode therefor which upon assembly with electrolyte provide wet seals between the electrolyte and the electrodes. The subassemblies provide ease of assembly resulting in reduced labor costs and long term stability and the separator plate design reduces the amount of material required for fabrication, in particular, of the main and feed rails comprising the wet seals, resulting in reduced material costs. In accordance with one embodiment, the separator plate design provides integration of the current collector and main rail and elimination of a separate feed rail.

This invention is particularly applicable to molten carbonates and solid conductor/solid oxide fuel cells.

Generally, fuel cell electrical output units are comprised of a stacked plurality of individual cells separated by inert or hi-polar electronically conductive ferrous metal separator plates. Individual cells are sandwiched together and secured into a single stacked unit to achieve desired fuel cell energy output. Each individual cell generally includes an anode and cathode electrode, a common electrolyte "tile" or "matrix", typically referred to as the active area components, and a fuel and oxidant gas source. Both fuel and oxidant gases are introduced through manifolds to their respective reactant chambers between the separator plate and the electrolyte tile. The area of contact between the electrolyte and other cell components to maintain separation of the fuel and oxidant gases and prevent and/or minimize gas leakage is known as the wet seal. A major factor contributing to premature fuel cell failure is corrosion and fatigue in the wet seal area. This failure is hastened by thin-film electrolyte corrosion of stainless steel surfaces of the separator plate at high temperatures and high thermal stresses resulting from differing thermal expansion characteristics between the separator plate and active area components during thermal cycling of the cell, causing weakening of the electrolyte tile structure through intracrystalline and transcrystalline cracking. Such failures permit undesired fuel and/or oxidant gas crossover and overboard gas leakage which interrupts the intended electrochemical oxidation and reduction reactions, thereby causing breakdown and eventual stoppage of cell current generation. Under fuel cell operating conditions, in the range of about 500° C. to about 700° C., molten carbonate electrolytes are very corrosive to ferrous metals which, due to their strength, are required for fuel cell housings and separator plates. The high temperature operation of stacks of molten carbonate fuel cells increases both the corrosion and thermal stress problems in the wet seal area, especially when the thermal coefficients of expansion of adjacent materials are different.

This invention provides fully internal manifolding of the fuel and oxidant gases to and from the individual cells of an assembled stack in a manner, due to the design of the cell components, which provides ease of assembly, long term endurance, stability of fuel cell operation, and a reduced number of individual cell components, thereby eliminating fit up problems between the various cell components.

2. Description of the Prior Art

Commercially viable molten carbonate fuel cell stacks may contain up to about 600 individual cells, each having a planar area in the order of at least eight square feet. In stacking such individual cells, separator plates separate the individual cells with fuel and oxidant each being introduced between a set of separator plates, the fuel being introduced between one face of a separator plate and the anode side of an electrolyte matrix and oxidant being introduced between the other face of the separator plate and the cathode side of a second electrolyte matrix. Due to the thermal gradients between cell assembly and cell operating conditions, differential thermal expansions, and the necessary strength of materials used for the manifolds, close tolerances and very difficult engineering problems are presented.

Conventionally, stacks of individual molten carbonate fuel cells have been constructed with spacer strips around the periphery of a separator plate to form wet seals. Various means of sealing in the environment of the high temperature fuel cell wet seal area are disclosed in U.S. Pat. No. 4,579,788 which teaches wet seal strips fabricated utilizing powder metallurgy techniques; U.S. Pat. No. 3,723,186 which teaches the electrolyte itself comprised of inert materials in regions around its periphery to establish an inert peripheral seal between the electrolyte and frame or housing; U.S. Pat. No. 4,160,067 which teaches deposition of inert materials onto or impregnated into the fuel cell housing or separator in wet seal areas; U.S. Pat. No. 3,867,206 which teaches a wet seal between electrolyte-saturated matrix and electrolyte-saturated peripheral edge of the electrodes; U.S. Pat. No. 4,761,348 which teaches peripheral rails of gas impermeable material to provide a gas sealing function to isolate the anode and cathode from the oxidant and fuel gases, respectively; U.S. Pat. No. 4,329,403 which teaches a graded electrolyte composition for a more gradual transition in the coefficient of thermal expansions in passing from the electrodes to the inner electrolyte region; and U.S. Pat. No. 3,514,333 which teaches housing of alkali metal carbonate electrolytes in high temperature fuel cells by use of a thin aluminum sealing gasket. None of the above patents deal with sealing around internal fuel and oxidant manifolds in fuel cell stacks.

U.S. Pat. No. 4,510,213 teaches transition frames surrounding the active portion of the cell units to provide fuel and oxidant manifolds to the gas compartments of the individual cells, the manifolds not passing through the separators nor the electrolyte tiles of the cells. The transition frames require complicated insulating between adjacent cells and are made up of several separate and complicated components. U.S. Pat. No. 4,708,916 teaches internal manifolding of fuel and external manifolding of oxidant for molten carbonate fuel cells in which sets of fuel manifolds pass through electrodes as well as electrolytes and separators in a central portion and at opposite ends of the individual cells to provide shortened fuel flow paths. The end fuel manifolds are in a thickened edge wall area of the separator plate while the central fuel manifolds pass through a thickened central region and sealing tape impregnated with carbonate or separate cylindrical conduit inserts are provided extending through the cathode.

Internal manifolding has been attempted wherein multiple manifold holes along opposite edges of the cell have been used to provide either co- or counter-current flow of fuel and oxidant gases. These manifold holes for fuel have been located in a broadened peripheral wet seal area along opposing edges, but the manifolds have been complicated structures exterior to the electrolyte or passing through at least one of the electrodes. However, adjacent manifold holes are used for fuel and oxidant which provides short paths across a short wet seal area and leakage of the gases as well as the necessarily broadened peripheral seal area undesirably reducing the cell active area, as shown, for example, in U.S. Pat. No. 4,769,298. Likewise, prior attempts to provide internal manifolding have used multiple manifolded holes along broadened peripheral wet seal areas on each of all four edges of the cell to provide crossflow, but again, short paths between adjacent fuel and oxidant manifolds required similar complicated structures and the holes caused leakage of the gases and further reduced the cell active area.

A fully internally manifolded molten carbonate fuel cell stack is taught by U.S. Pat. No. 4,963,442, U.S. Pat. No. 5,045,413, and U.S. Pat. No. 5,077,148. each of which teaches a separator plate for a molten carbonate fuel cell stack having a flattened peripheral wet seal structure extending to contact the electrolytes on each face of the separator plates completely around their periphery forming a separator plate/electrolyte wet seal under cell operating conditions, and having a plurality of aligned perforations surrounded by a flattened manifold wet seal structure extending to contact the electrolyte on each face of the separator plate, forming a separator plate/electrolyte wet seal under cell operating conditions. In accordance with the teachings of these patents, the separator plates are pressed metal plates in which the flattened peripheral wet seal structure and the extended manifold wet seal structure on one face of the separator plate is a pressed shaping of the separator plate and on the other face of the separator plate is a pressed sheet metal shape fastened to said other face of the separator plate. In addition, conduits through the manifold wet seal structures are provided between one set of manifolds and anode chambers on one face of the separator plates for fuel gas and between the other set of manifolds and the cathode chambers on the other face of the separator plates for oxidant. These conduits are formed by corrugated metal or holes through sheet metal structures secured to the separator plate. Thus, a separator plate for a fuel cell unit in accordance with the teachings of these patents comprises as many as nine (9) individual pieces welded together and a fuel cell unit in accordance with the teachings of these patents comprises at least five (5) pieces in addition to the separator plate, namely, cathode and anode current collectors, cathode and anode electrodes and an electrolyte. In addition, to accommodate the current collectors and electrodes within the center portion of the separator plate, the wet seal structures are in the form of steps such that the current collectors and electrodes, when disposed in the center portion of the separator plates, are flush with the top portion of the step which forms the wet seal between the separator plate and the electrolyte. Such fit up of pieces into pressed steps results in variable elevational discontinuities which are known to cause cracking of the electrolyte and result in gas crossflow through the electrolyte tiles.

SUMMARY OF THE INVENTION

Accordingly, it is one object of this invention to provide a fuel cell unit having a reduced number of individual components.

It is another object of this invention to provide a separator plate comprising a reduced number of components for assembly.

It is another object of this invention to provide a fuel cell stack in which each of the components comprising the stack assembly extends to the peripheral edge of said stack.

It is another object of this invention to provide a fuel cell unit in which the amount of waste material generated in the assembly thereof is reduced.

It is yet another object of this invention to provide a design for a fuel cell unit which eliminates fit up problems between individual components of the fuel cell, in particular, the current collector and main and feed rails, that is, the peripheral and manifold wet seal structures, of the separator plate.

These and other objects are achieved in a fuel cell stack in accordance with one embodiment of this invention comprising a plurality of fuel cell units, each of which fuel cell units comprises an anode and a cathode, an electrolyte in contact with one face of the anode and with an opposite facing face of the cathode and a separator plate separating each cell unit between the anode and cathode forming an anode chamber between one face of the separator plate and the anode and a cathode chamber between the opposite face of the separator plate and the cathode. The anode chamber is in gas communication with a fuel gas supply and outlet and the cathode chamber is in gas communication with an oxidant gas supply and outlet. The electrolytes and separator plates extend to the peripheral edge of the fuel cell stack, the separator plates having a flattened peripheral wet seal structure extending to contact the electrolytes on each face of the separator plates completely around their periphery forming a peripheral separator plate/electrolyte wet seal under cell operating conditions. The electrolytes and the separator plates each are provided with a plurality of aligned perforations, the perforations in the separator plates being surrounded by a manifold wet seal structure extending to contact the electrolyte on each face of the separator plate to form a manifold separator plate/electrolyte wet seal under cell operating conditions. The separator plate comprises an anode current collector, a cathode current collector and a main plate disposed between the anode current collector and the cathode current collector. The anode current collector forms the flattened peripheral wet seal structure and manifold wet seal structure on the anode side of the separator plate and the cathode current collector forms the flattened peripheral wet seal structure and manifold wet seal structure on the cathode side of the separator plate. Each of the current collectors is fastened to the main plate to provide peripheral seals between the current collectors and the main plate as well as peripheral manifold seals. The separator plate further comprises means for providing fuel gas communication between one set of the manifolds and the anode chambers on one face of each of the separator plates and means for providing oxidant gas communication between the other set of manifolds and the cathode chambers on the other face of each of the separator plates, thereby providing fully internal manifolding of fuel and oxidant gases to and from each said fuel cell unit in the fuel cell stack.

In accordance with another embodiment of this invention, the separator plate comprises either an anode or cathode current collector and a main plate where the current collector forms the flattened peripheral wet seal structure and the manifolded wet seal structures on one face of the separator plate and the main plate forms the flattened peripheral wet seal structure and manifold wet seal structures on the other face of the separator plate. Thus, if the separator plate comprises an anode current collector, then the flattened peripheral wet seal structure and manifold wet seal structures formed by the main plate face the cathode and cathode current collector of the fuel cell unit. Likewise, if the separator plate comprises a cathode current collector, then the flattened peripheral wet seal structure and the manifold wet seal structures formed by the main plate face the anode and anode current collector. In accordance with this embodiment of the invention, the number of full-sheet sheet metal components required to manufacture a separator plate is reduced to two (2). To prevent gas leakage through passages formed between the main rails on both faces of the separator plate at least two (2) blocker-filler inserts in the form of a caulking to fill down-depressions pressed into the current collector/main rail are provided.

In accordance with one embodiment of this invention, the current collectors are pressed metal plates comprising a plurality of openings in a central region and said aligned perforations, both of which are surrounded by a solid metal region. To form the flattened peripheral wet seal structure and the manifold wet seal structures in each of the current collectors, the metal plates are pressed, the solid metal regions surrounding the plurality of openings in the central region and the aligned perforations forming the flattened peripheral wet seal structure, or main rail, and the manifold wet seal structures, that is, also a main rail, or a feed rail.

In accordance with a particularly preferred embodiment of this invention, the anode current collector and the anode are integrated with one another, forming a one piece anode/anode current collector. Similarly, the cathode and the cathode current collector are integrated with one another to form a one piece cathode/cathode current collector.

In accordance with another embodiment of this invention, corrugations are provided in the region of the manifold wet seal structures through which oxidant gas flows from one set of manifolds to the cathode chambers on one face of the separator plates and fuel gas flows from a second set of manifolds to the anode chambers on the other face of the separator plates.

BRIEF DESCRIPTION OF THE DRAWINGS

These and other features of this invention will be better understood and appreciated from the following detailed description taken in conjunction with the figures, wherein.

DESCRIPTION OF PREFERRED EMBODIMENTS

Figure 1:
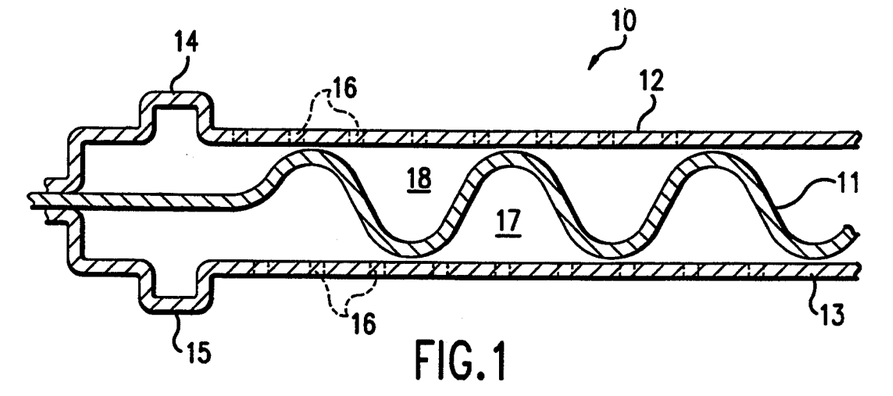
FIG. 1 is a cross-sectional view of a portion of a separator plate for a fuel cell in accordance with one embodiment of this invention.
Figure 2:
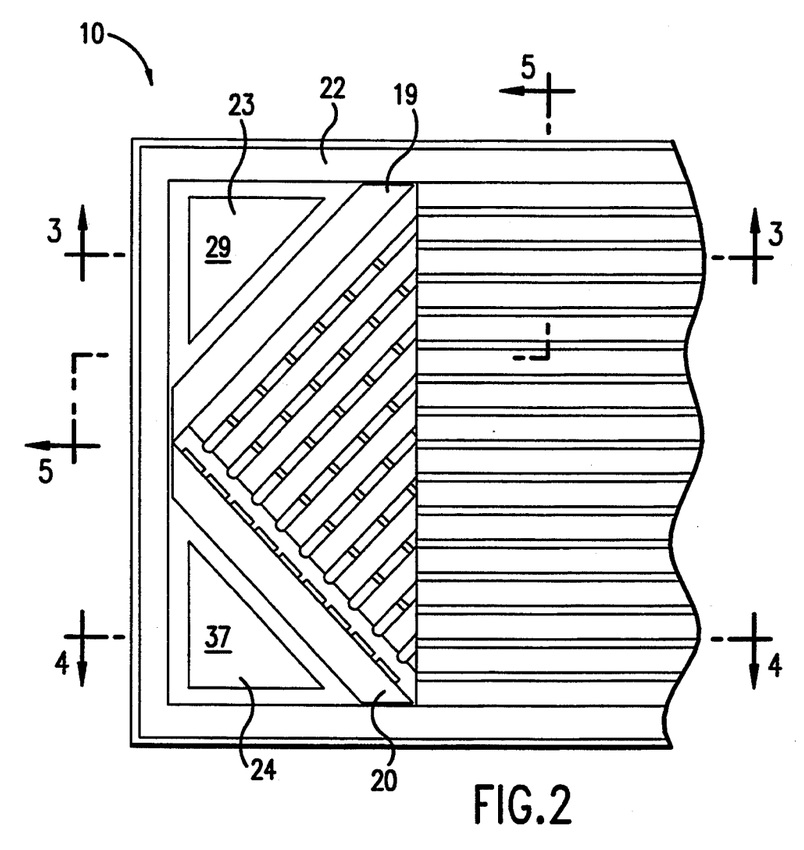
FIG. 2 is a schematic diagram of a plan view of a portion of a separator plate in accordance with one embodiment of this invention.
Figure 3:
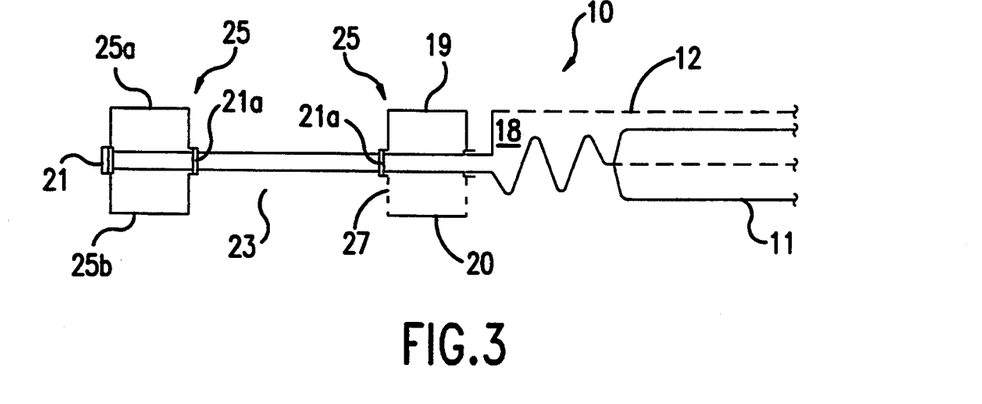
FIG. 3 is a side view of the separator plate shown in FIG. 2 along the line B—B.

A separator plate 10 for a molten carbonate fuel cell in accordance with one embodiment of this invention is shown in FIG. 1. Separator plate 10 comprises main plate 11, cathode current collector 12, and anode current collector 13. Each of cathode current collector 12 and anode current collector 13 form peripheral cathode main rail 14 and peripheral anode main rail 15, respectively, which form peripheral wet seal structure 22 shown in FIG. 2. Anode current collector 13 and cathode current collector 12 are pressed metal plates comprising a plurality of openings 16 in a central region as shown in FIG. 1 and a plurality of perforations 23, 24 as shown in FIG. 2. Both of said plurality of openings 16 and said perforations 23, 24 are surrounded by a solid metal region which form peripheral wet seal structure 22 comprising peripheral main rails 14, 15 and manifold wet seal structure 25 as shown in FIG. 3 comprising blocker rail 19 or feed rail 20 depending upon the function of the corresponding manifold formed by perforations 23, 24, which wet seal structures are integral with anode current collector 13 and cathode current collector 12. That is, if it is intended that a fuel gas or oxidant flow between perforation 24 and anode chamber 17 or cathode chamber 18, then manifold wet seal structure 25 comprises feed rail 20. Where no such fuel gas or oxidant flow is desired, as for example between perforation 23 and cathode chamber 18, then manifold wet seal structure 25 comprises blocker rail 19.

Figure 6:
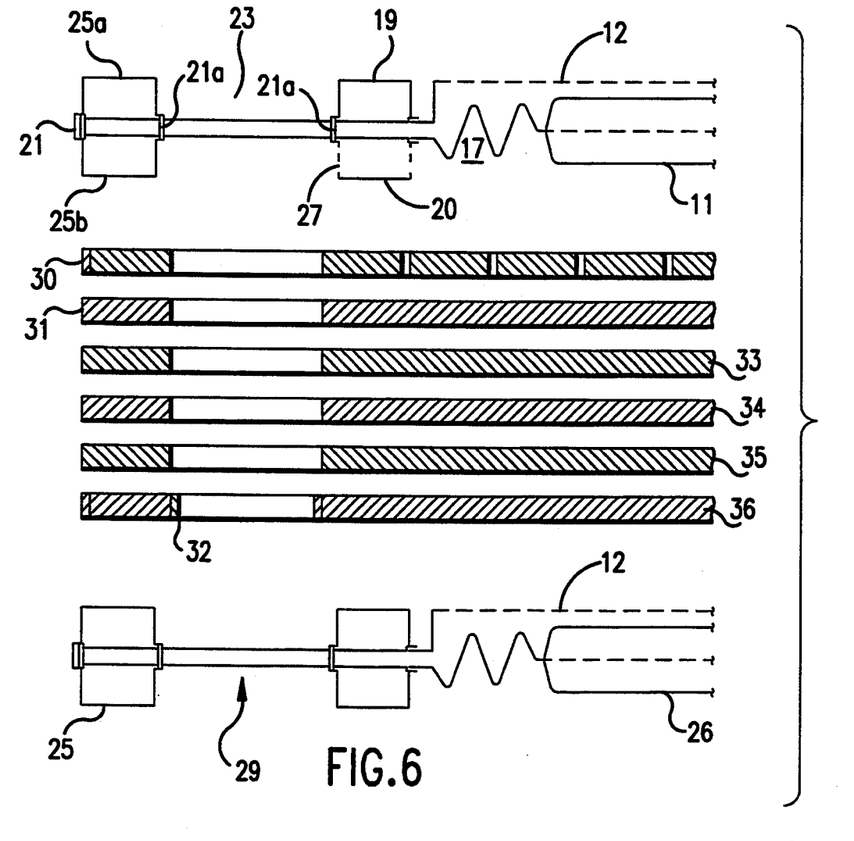
FIG. 6 shows a side view, slightly exploded, of a portion of a fuel cell stack in accordance with one embodiment of this invention.

As shown in FIG. 6, perforation 23 aligns with corresponding perforations in anode current collector 30, anode electrode 31, bubble barrier 33, electrolyte 34, carbonate 35, and cathode electrode 36 to form anode feed manifold 29 through which fuel gas is provided to anode chamber 17 formed by main plate 11 and anode current collector 30. To provide gas communication between anode feed manifold 29 and anode chamber 17, a portion of manifold wet seal structure 25 comprises feed rail 20 forming feed rail openings 27 through which fuel gas flows from anode feed manifold 29 into anode chamber 17.

In a particularly preferred embodiment of this invention, anode current collector 13, 30 is effectively eliminated by integration into the anode electrode to form an anode electrode/current collector and the anode main rail and feed rail functions are provided by the integrated anode electrode/current collector. Similarly, cathode current collector 12 is effectively eliminated by integration into the cathode electrode to form a cathode electrode/current collector and the cathode main rail and feed rail functions are provided by the integrated anode electrode/current collector. The result of this integration is a substantial reduction in the number of components comprising a fuel cell stack, thereby reducing the cost of assembly.

Anode current collector 13, cathode current collector 12, and main plate 11 extend to the peripheral edge of the fuel cell stack. To prevent leakage between components comprising separator plate 10, the peripheral edge of separator plate 10 is welded forming a seal 21 between the peripheral edges of cathode current collector 12, anode current collector 13, and main plate 11. The peripheral region of perforations 23, 24 are similarly welded to form seal 21a along the periphery of perforations of 23, 24 between cathode current collector 12, anode current collector 13, and main plate 11. Thus, fluid flowing through anode feed manifold 29 and cathode manifold 37 are prevented from leaking between the components comprising separator plate 10.

Figure 4:
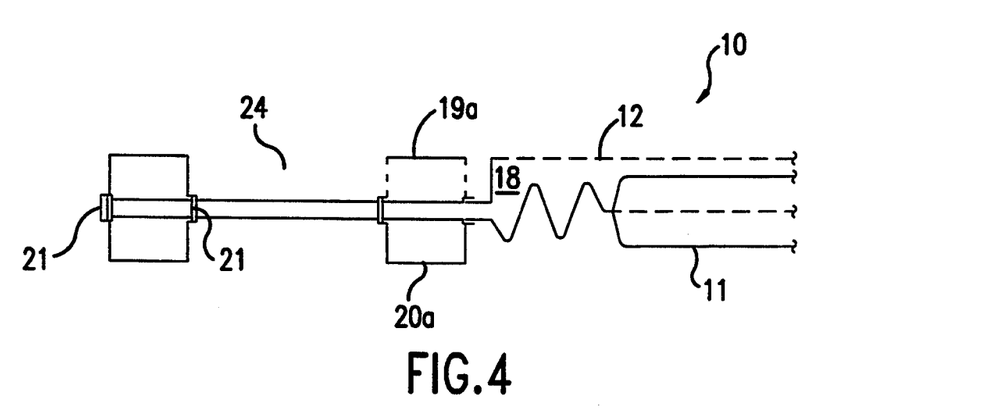
FIG. 4 is a side view of the separator plate shown in FIG. 2 along the line C—C.
Figure 5:
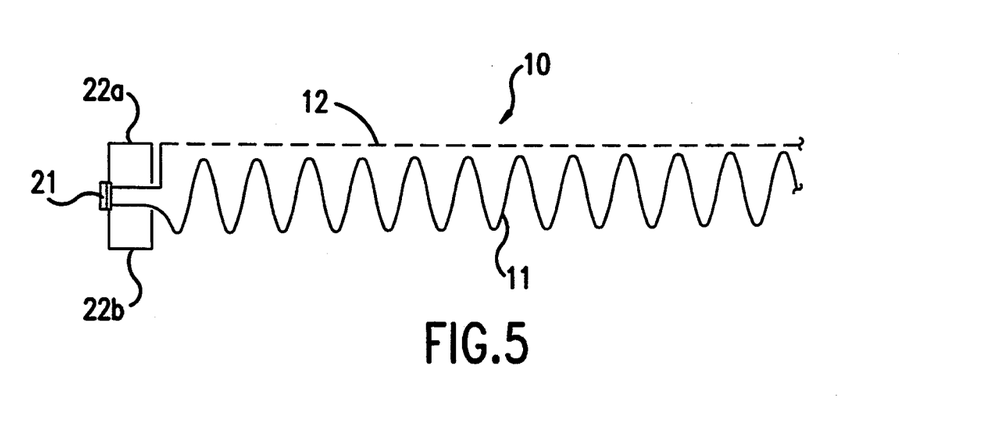
FIG. 5 is a side view of the separator plate shown in FIG. 2 along the line A—A.

FIGS. 3, 4, and 5 show a particularly preferred embodiment of this invention in which separator plate 10 comprises cathode current collector 12 with integrated cathode flattened peripheral wet seal structure 22a and main plate 11 with integrated anode flattened peripheral wet seal structure 22b. Separator plate 10 further comprises cathode current collector 12 with integrated cathode manifold wet seal structure 25a comprising blocker rail 19 and main plate 11 with integrated anode manifold wet seal structure 25b and feed rail 20. It will be apparent to those skilled in the art that anode current collector 13 may be substituted for cathode current collector 12 in which case the wet seal structures formed by main plate 11 are cathode wet seal structures. Thus, in accordance with this embodiment of the invention, it is apparent that a suitable separator plate for a fuel cell stack can be constructed of two pieces.

Figure 8:
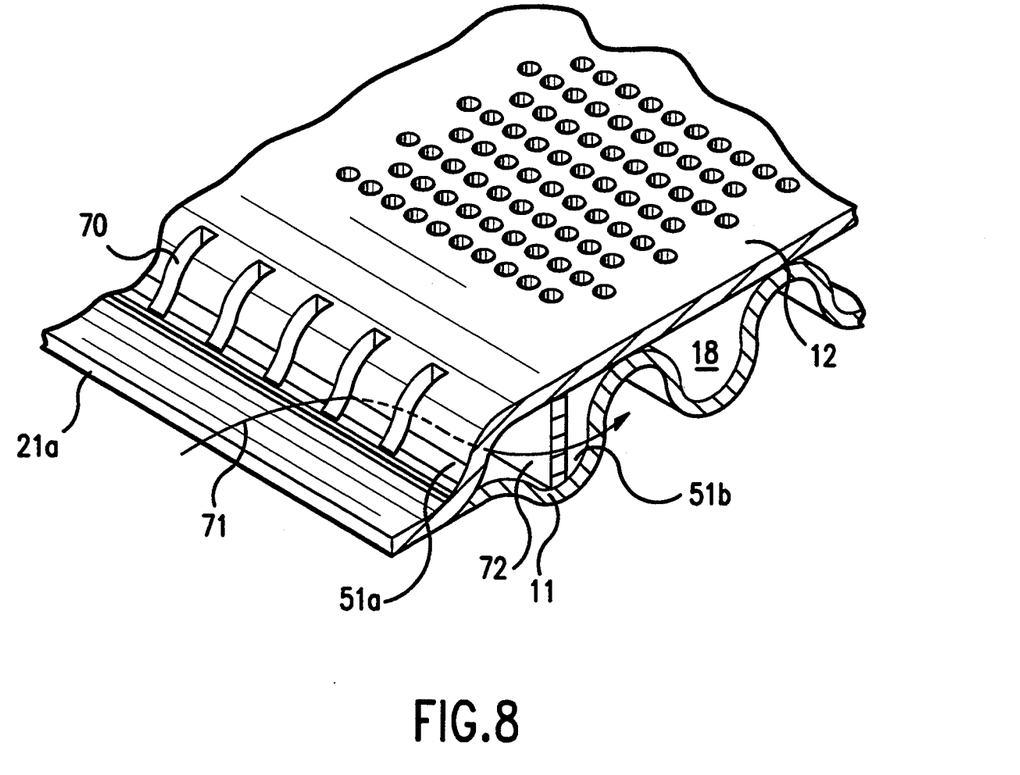
FIG. 8 is a schematic diagram of a portion of a feed rail for a separator plate in accordance with one embodiment of this invention.

FIG. 8 shows a portion of a 2-piece separator plate in accordance with one embodiment of this invention comprising main plate 11 and cathode current collector 12 with integrated cathode feed rail 51a. Conduits for oxidant flow into cathode chamber 18 as shown by arrow 71 are provided by slits 70. To provide support for cathode current collector 12, a plurality of beams 72 are interspersed along the length of integrated cathode feed rail 51a disposed between cathode current collector 12 and main plate 11 within the channel formed by integrated cathode feed rail 51a and integrated anode manifolded wet seal structure 51b. It will be apparent to those skilled in the art that a 2-piece separator plate in accordance with this embodiment of this invention may be formed using an anode current collector in place of cathode current collector 12. In accordance with such embodiment, main plate 11 forms an integrated cathode manifold wet seal structure.

Figure 7:
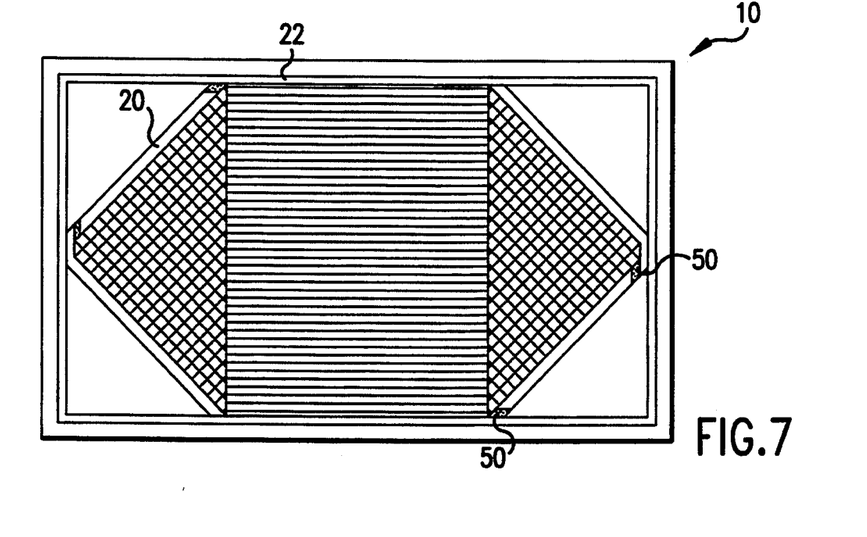
FIG. 7 is a plan view of a separator plate in accordance with one embodiment of this invention.

As shown in FIG. 7, the ends of feed rail 20 in accordance with one embodiment of this invention integrate with peripheral main rail 22 providing possible communication between the channel formed between feed rail 20 on one face of the separator plate and the manifold wet seal structure on the opposite face of the separator plate. To close off such communication and thus prevent gas flow from feed rail 20 into peripheral main rail 22, impressions 50 are formed in the ends of the manifold wet seal structures which bottom out in feed rail 20 so as to effectively seal between the channel formed by feed rail 20 on one face of the separator plate and the manifold wet seal structure on the opposite face of the separator plate. The impression in the manifold wet seal structure is filled with a caulking material to provide continuity of the manifold wet seal formed under cell operating conditions.

Figure 9:
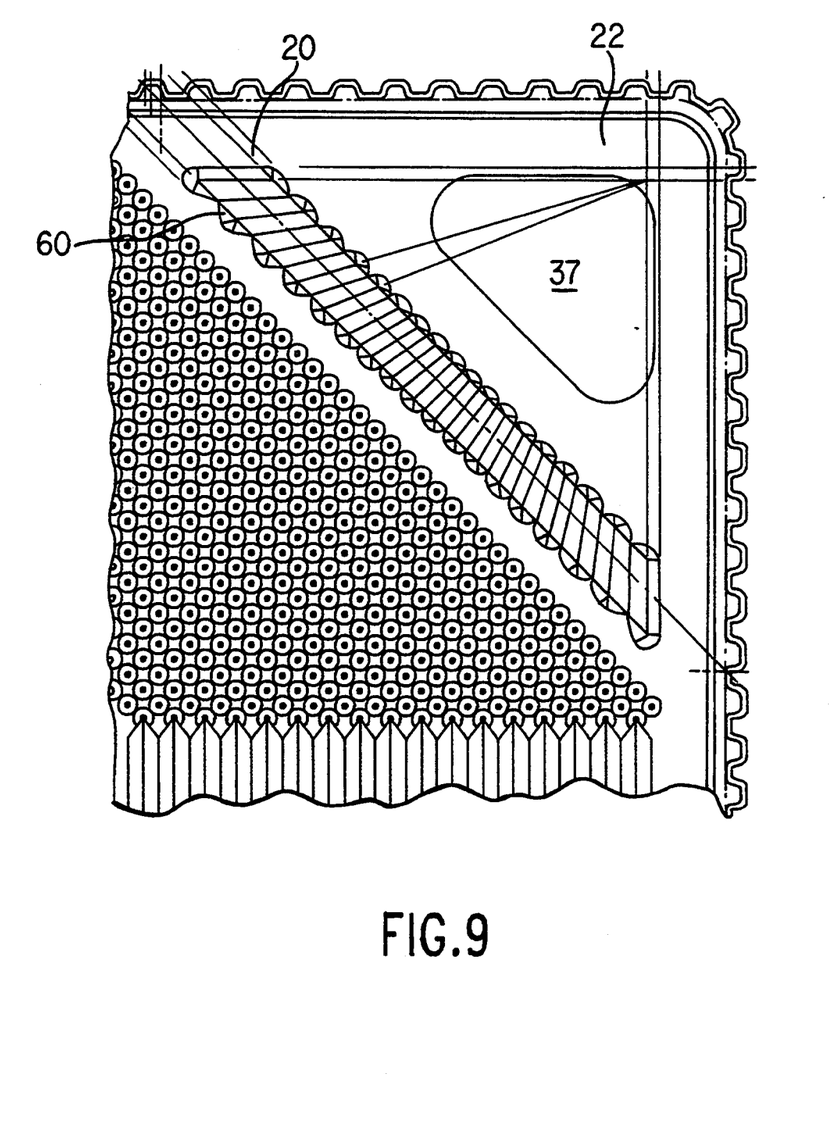
FIG. 9 is a diagram of a portion of a separator plate showing a feed rail in accordance with another embodiment of this invention.

In accordance with another embodiment of this invention, as shown in FIG. 9, the conduits for providing gas communication between anode feed manifold 29 and anode chamber 17 and cathode feed manifold 37 and cathode chamber 18 are in the form of corrugations 60 formed by feed rail 20.

As previously stated, and as shown in FIG. 6, each of the components comprising separator plate 10 extends to the peripheral edge of the cell assembly. In addition, each of the remaining components of the cell assembly, namely, anode electrode 31, bubble barrier 33, electrolyte 34, carbonate 35, and cathode electrode 36, extend to the peripheral edge of the cell assembly. To protect the edges of cathode 36 which are exposed to hydrogen and to the anode feed and spent gas manifold, all such edges are protected with protective coating 32, such as aluminum. Similar protection is required for the edges of anode current collector 30, anode electrode 31 and bubble barrier 33 which are exposed to air in the cathode feed and spent gas manifolds. Similarly, protection for anode electrode 31 and bubble barrier 33 is provided in the form of protective coating 32, protective coating 32 comprising aluminum foil or other suitable material.

FIG. 1 shows peripheral cathode main rail 14 and peripheral anode main rail 15 as steps, the remaining components of the cell assembly such as electrolyte tile 34, anode electrode 31 and cathode electrode 36 disposed within the recess adjacent the face of cathode current collector 12 and anode current collector 13 as appropriate. In a particularly preferred embodiment, particularly in view of the extension of all of the components of the cell assembly to the peripheral edge of the cell assembly, said step may be eliminated.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a fuel cell stack comprising a plurality of fuel cell units, each said fuel cell unit comprising an anode and a cathode, an electrolyte in contact with one face of said anode and an electrolyte in contact with an opposite facing face of said cathode, and a separator plate separating said cell unit between said anode and said cathode forming an anode chamber between one face of said separator plate and said anode and a cathode chamber between the opposite face of said separator plate and said cathode, said anode chamber in gas communication with a fuel gas supply and outlet and said cathode chamber in gas communication with an oxidant gas supply and outlet, said electrolytes and said separator plates extending to the edge of said fuel cell stack, said separator plates having a flattened peripheral wet seal structure extending to contact said electrolytes on each face of said separator plates completely around their periphery forming a peripheral separator plate/electrolyte wet seal under cell operating conditions, said electrolytes and said separator plates each having a plurality of aligned perforations, each of said perforations in said separator plates being surrounded by a manifold wet seal structure extending to contact said electrolyte on each face of said separator plate forming a manifold separator plate/electrolyte wet seal under cell operating conditions to form a plurality of gas manifolds extending through said cell stack, the improvement comprising:

said separator plate comprising an anode current collector, a cathode current collector and a main plate, said main plate disposed between said anode current collector and said cathode current collector;

said anode current collector forming said flattened peripheral wet seal structure and said manifold set seal structure on the anode side of said separator plate;

said cathode current collector forming said flattened peripheral wet seal structure and said manifold wet seal structure on the cathode side of said separator plate;

means for providing fuel gas communication between one set of said manifolds and said anode chambers on one face of said separator plates; and means for providing oxidant gas communication between the other set of manifolds and said cathode chambers on the other face of said separator plates, said means for providing fuel gas communication and said means for providing oxidant gas communication providing fully internal manifolding of fuel and oxidant gases to and from each said unit fuel cell in said fuel cell stack.

2. In a fuel cell stack in accordance with claim 1, wherein said anode current collector and said cathode current collector are pressed metal plates comprising a plurality of openings in a central region and said openings and said aligned perforations are surrounded by a solid metal region.

3. In a fuel cell stack in accordance with claim 2, wherein said flattened peripheral wet seal structure and said manifold wet seal structure formed by said current collectors comprise a pressed shaping of said metal plates.

4. In a fuel cell stack in accordance with claim 1, wherein said anode and said anode current collector are integral with each other, forming a one-piece anode/anode current collector.

5. In a fuel cell stack in accordance with claim 1, wherein said cathode and said cathode current collector are integral with each other, forming a one-piece cathode/cathode current collector.

6. In a fuel cell stack in accordance with claim 1, wherein said means for providing fuel gas communication between said manifolds and said anode chambers comprises conduits through said manifold wet seal structure formed by said anode current collector.

7. In a fuel cell stack in accordance with claim 1, wherein said means for providing oxidant gas communication between said manifolds and said cathode chambers comprises conduits through said manifold wet seal structure formed by said cathode current collector.

8. In a fuel cell stack in accordance with claim 6, wherein said conduits through said manifold wet seal structure comprise corrugations formed by said anode current collector.

9. In a fuel cell stack in accordance with claim 7, wherein said conduits through said manifold wet seal structure comprise corrugations formed by said cathode current collector.

10. In a fuel cell stack in accordance with claim 1, wherein said means for providing fuel gas communication between said fuel gas manifolds and said anode chambers comprises fuel gas conduits through said manifold wet seal structure formed by said anode current collector, and said means for providing oxidant gas communication between said oxidant manifolds and said cathode chambers comprises oxidant conduits through said manifold wet seal structure formed by said cathode current collector.

11. In a fuel cell in accordance with claim 10, wherein said fuel gas conduits comprise corrugations formed by said anode current collector and said oxidant conduits comprise corrugations formed by said cathode current collector.

12. In a fuel cell in accordance with claim 1, wherein said electrolyte comprises alkali metal carbonates.

13. In a fuel cell unit having an anode and a cathode, an electrolyte in contact with one face of said anode and an electrolyte in contact with an opposite facing face of said cathode, a separator plate separating said cell unit between said anode and said cathode forming an anode chamber between one face of said separator plate and said anode and a cathode chamber between the opposite face of said separator plate and said cathode, said anode chamber in gas communication with a fuel gas supply and outlet and said cathode chamber in gas communication with an oxidant gas supply and outlet, and said separator plate having a flattened peripheral anode wet seal structure on the anode side of said separator plate and a flattened peripheral cathode wet seal structure on the cathode side of said separator plate, each said flattened peripheral wet seal structure extending to contact said electrolyte forming a peripheral separator plate/electrolyte wet seal under cell operating conditions, and said electrolytes and said separator plate having a plurality of aligned perforations, said perforations in said separator plates being surrounded by a manifold wet seal structure extending to contact said electrolyte on each face of said separator plate forming a manifold separator plate/electrolyte wet seal under cell operating conditions, the improvement comprising:

said separator plate comprising an anode current collector, a cathode current collector and a main plate, said anode current collector disposed on the side of said main plate facing said anode and said cathode current collector disposed on the side of said main plate facing said cathode, said anode current collector forming said flattened peripheral anode wet seal structure and said anode manifold wet seal structure on the anode side of said separator plate and said cathode current collector forming said flattened peripheral cathode wet seal structure and said manifold cathode wet seal structure on the cathode side of said separator plate.

14. In a fuel cell unit in accordance with claim 13, wherein said anode current collector and said cathode current collector are pressed metal plates comprising a plurality of openings in a central region and said openings and said aligned perforations are surrounded by a solid metal region.

15. In a fuel cell unit in accordance with claim 14, wherein said flattened peripheral wet seal structure and said manifold wet seal structure formed by said current collectors comprise a pressed shaping of said metal plates.

16. In a fuel cell unit in accordance with claim 13, wherein said anode and said anode current collector are integral with each other, forming a one-piece anode/anode current collector and said cathode and said cathode current collector are integral with each other, forming a one-piece cathode/cathode current collector.

17. In a fuel cell unit in accordance with claim 13, wherein said manifold wet seal structures comprise an anode conduit extending between one of said aligned perforations and said anode chamber and a cathode chamber extending between another of said aligned perforations and said cathode chamber, said anode conduit in communication with said fuel gas supply and said cathode conduit in communication with said oxidant gas supply.

18. In a fuel cell unit in accordance with claim 17, wherein said conduits comprise corrugations formed by said current collectors.

19. In a fuel cell unit having an anode and a cathode, an electrolyte in contact with one face of said anode and an electrolyte in contact with an opposite facing face of said cathode, a separator plate separating said cell unit between said anode and said cathode forming an anode chamber between one face of said separator plate and said anode and a cathode chamber between the opposite face of said separator plate and said cathode, said anode chamber in gas communication with a fuel gas supply and outlet and said cathode chamber in gas communication with oxidant gas supply and outlet, and said separator plate having a flattened peripheral anode wet seal structure on the face of said separator plate facing said anode and the face of said separator plate facing said cathode, each said flattened wet seal structure extending to contact said electrolyte forming a peripheral separator plate/electrolyte wet seal under cell operating conditions, and said electrolytes and said separator plate having a plurality of aligned perforations, said perforations in said separator plates being surrounded by a manifold wet seal structure extending to contact said electrolyte on each face of said separator plate forming a manifold separator plate/electrolyte wet seal under cell operating conditions, the improvement comprising:

said separator plate comprising a current collector, and a main plate, said current collector forming said flattened peripheral anode wet seal structures and said manifold wet seal structure on one face of said separator plate and said main plate forming said flattened peripheral wet seal structure and said manifold wet seal structures on the other face of said separator plate.

20. A fuel cell unit in accordance with claim 19, wherein said current collector and said main plate are pressed metal plates.

21. A fuel cell unit in accordance with claim 20, wherein said current collector comprises a plurality of openings in a central region and said openings and said aligned perforations are surrounded by a solid metal region.

22. A fuel cell unit in accordance with claim 20, wherein said flattened peripheral wet seal structure and said manifold wet seal structures formed by said current collector and said main plate comprise a pressed shaping of said metal plates.

23. A fuel cell unit in accordance with claim 19, wherein said current collector is integral with one of said electrodes forming a one piece electrode/current collector.

24. A fuel cell unit in accordance with claim 19, wherein each of said manifold wet seal structures comprises a conduit extending between one of said aligned perforations and a corresponding electrode chamber, said conduit in communication with one of said fuel gas supply and said oxidant gas supply.

25. A fuel cell unit in accordance with claim 24, wherein said conduits comprise corrugations formed by said pressed shaping of said metal plates.

26. A fuel cell unit in accordance with claim 24, wherein said conduits through said manifold wet seal structures formed by said current collector are in the form of slots disposed in said manifold wet seal structures between said aligned perforations and said corresponding electrode chamber.

* * * * *